United States Patent
Kwon et al.

(10) Patent No.: US 12,154,430 B1
(45) Date of Patent: Nov. 26, 2024

(54) DEVICE AND SYSTEM FOR SUPPORTING COGNITIVE INFORMATION SHARING IN AUTONOMOUS VEHICLE

(71) Applicant: Industry-Academic Cooperation Foundation of Yeungnam University, Gyeongsan-si (KR)

(72) Inventors: Seong Jin Kwon, Gyeongsan-si (KR); Hyun Woo Jin, Gyeongsan-si (KR)

(73) Assignee: Industry-Academic Cooperation Foundation of Yeungnam University, Gyeongsan-si (KR)

( * ) Notice: Subject to any disclaimer, the term of this patent is extended or adjusted under 35 U.S.C. 154(b) by 0 days.

(21) Appl. No.: 18/652,816

(22) Filed: May 2, 2024

(30) Foreign Application Priority Data

Nov. 3, 2023 (KR) .......... 10-2023-0150489

(51) Int. Cl.
G08G 1/0968 (2006.01)
B60Q 1/50 (2006.01)
G06K 7/14 (2006.01)
G08G 1/0967 (2006.01)

(52) U.S. Cl.
CPC ..... *G08G 1/096844* (2013.01); *B60Q 1/5035* (2022.05); *B60Q 1/507* (2022.05); *G06K 7/1417* (2013.01); *G08G 1/096791* (2013.01); *B60Q 2800/10* (2022.05)

(58) Field of Classification Search
CPC ....... G08G 1/096844; G08G 1/096791; B60Q 1/507; B60Q 1/5035; B60Q 2800/10; G06K 7/1417
See application file for complete search history.

(56) References Cited

U.S. PATENT DOCUMENTS

| | | | | |
|---|---|---|---|---|
| 6,154,493 A * | 11/2000 | Acharya | ............... | H04N 19/186 375/240.19 |
| 10,134,280 B1 * | 11/2018 | You | ......... | B60Q 1/525 |
| 11,153,721 B2 * | 10/2021 | Graefe | ............ | G08G 1/096791 |
| 11,192,495 B2 * | 12/2021 | Elli | .......... | H04L 12/40 |
| 11,584,394 B2 * | 2/2023 | Matsushita | .......... | G05D 1/0011 |
| 11,586,223 B2 * | 2/2023 | Iwasaki | .................. | G08G 1/202 |
| 11,586,991 B2 * | 2/2023 | Skaling | .................. | G06Q 50/40 |
| 11,651,395 B2 * | 5/2023 | Nishiyama | ............ | H04W 4/024 705/14.63 |
| 11,659,372 B2 * | 5/2023 | Lu | .......... | G06V 20/56 709/224 |

(Continued)

FOREIGN PATENT DOCUMENTS

| | | |
|---|---|---|
| KR | 20230024162 A | 2/2023 |
| KR | 20230131010 A | 9/2023 |

*Primary Examiner* — Luis A Martinez Borrero
(74) *Attorney, Agent, or Firm* — NKL Law; Jae Youn Kim

(57) ABSTRACT

A device and system that support cognitive information sharing of autonomous vehicles are disclosed. An autonomous traveling control device for an autonomous vehicle traveling on a road together with at least one non-autonomous vehicle includes a data collector that collects information for performing autonomous traveling, a QR code generator that generates a QR (Quick Response) code including the collected information, and a traveling controller that performs control so that autonomous traveling is performed while the QR code is output to the outside on at least one of a front, side, and rear of the autonomous vehicle.

16 Claims, 11 Drawing Sheets

(56) References Cited

U.S. PATENT DOCUMENTS

| | | | |
|---|---|---|---|
| 11,760,370 B2* | 9/2023 | Galliano, III | G02B 27/0101 |
| | | | 701/23 |
| 11,776,015 B2* | 10/2023 | Manicka | H04W 4/40 |
| | | | 455/418 |
| 11,801,787 B2* | 10/2023 | Spall | B60Q 1/2603 |
| 2015/0220991 A1* | 8/2015 | Butts | G06Q 30/0265 |
| | | | 705/14.62 |
| 2018/0186309 A1* | 7/2018 | Batten | B60Q 1/543 |
| 2019/0132709 A1* | 5/2019 | Graefe | G08G 1/0133 |
| 2020/0130570 A1* | 4/2020 | Elli | B60Q 1/545 |
| 2021/0362598 A1* | 11/2021 | Oh | B60W 60/001 |
| 2021/0389138 A1* | 12/2021 | Morton | G08G 1/096791 |
| 2022/0101728 A1* | 3/2022 | Wolf | G08G 1/096844 |
| 2022/0182793 A1* | 6/2022 | Graefe | H04W 4/06 |
| 2023/0024162 A1* | 1/2023 | Nishio | H04L 5/0007 |
| 2023/0231916 A1* | 7/2023 | Salter | H04L 67/12 |
| | | | 709/206 |
| 2023/0413026 A1* | 12/2023 | Khosla | G08G 1/096791 |
| 2024/0046783 A1* | 2/2024 | Das | G08G 1/167 |

* cited by examiner

DEVICE AND SYSTEM FOR SUPPORTING COGNITIVE INFORMATION SHARING IN AUTONOMOUS VEHICLE

CROSS-REFERENCE TO RELATED APPLICATION

This application claims priority to and the benefit of Korean Patent Application No. 10-2023-0150489 filed in the Korean Intellectual Property Office on Nov. 3, 2023, the entire contents of which are incorporated herein by reference.

TECHNICAL FIELD

The present invention relates to an information sharing technology, and more specifically, to a device and method for supporting cognitive information sharing in an autonomous vehicle that helps in sharing traveling-related information of the autonomous vehicle with a non-autonomous vehicle without a separate device.

BACKGROUND

A connectivity technology that supports a V2X (vehicle to everything) technology is being introduced in autonomous vehicles, and various infotainment services are currently being provided to a connected car using vehicle communication. As the technology develops and the V2X technology and autonomous traveling technology are successfully integrated, users will be able to enjoy a wider variety of services and perform safer and more efficient traveling with the autonomous traveling technology.

However, not all vehicles currently traveling on a road are autonomous vehicles, and autonomous vehicles and non-autonomous vehicles (regular vehicles) are all being traveled. Accordingly, in order for a non-autonomous vehicle to communicate with an autonomous vehicle, the only option is to incur additional costs and mount a separate OBU (on-board unit).

SUMMARY

The problem to be solved by the present invention is to provide a device and method for supporting cognitive information sharing in an autonomous vehicle that helps in sharing traveling-related information collected by an autonomous traveling control device included in the autonomous vehicle with a non-autonomous traveling control device included in a non-autonomous vehicle without a separate device, so that a driver of the non-autonomous vehicle can obtain information necessary for driving.

In order to solve the above problem, an autonomous traveling control device for an autonomous vehicle traveling on a road together with at least one non-autonomous vehicle according to the present invention includes a data collector configured to collect information for performing autonomous traveling; a QR code generator configured to generate a QR (Quick Response) code including the collected information; and a traveling controller configured to perform control so that autonomous traveling is performed while the QR code is output to the outside on at least one of a front, side, and rear of the autonomous vehicle.

Further, the data collector collects at least one of video information, distance information, position information, speed information, acceleration information, direction information, gravity information, weather information, road information, traffic information, and surrounding object information.

Further, the QR code generator changes a shape of the code each time the QR code generates the QR code.

Further, the traveling controller perform control so that the QR code is not output on the side of the autonomous vehicle in a direction in which there is no neighboring lane when a traveling lane of the autonomous vehicle is one of lanes at both ends of the road.

Further, the traveling controller performs control so that output brightness of the QR code is high when illuminance of an external environment in which the autonomous vehicle travels is lower than a preset reference.

A non-autonomous traveling control device for a non-autonomous vehicle traveling on a road together with at least one autonomous vehicle that outputs a QR code according to the present invention includes a QR code recognizer configured to determine whether received video information includes a QR code when video information obtained by filming a traveling process of the non-autonomous vehicle is received; a QR code analyzer configured to detect information included in the QR code when the QR code is included; and a route guide configured to select only information necessary for traveling in the detected information and perform control so that the selected information is provided to a driver.

Further, the QR code analyzer sets priorities for recognized QR codes when a plurality of QR codes are recognized, and assigns a greater weight to the QR codes in descending order of priorities to distinguish between information importance degrees of the respective QR codes.

Further, the QR code analyzer sets a higher priority for the QR code output from the autonomous vehicle closer to the non-autonomous vehicle.

Further, the route guide sorts the information included in the QR code in descending order of information importance degrees and selects information needed by the driver based on the sorted information.

Further, the route guide determines whether update of a currently set traveling route is necessary using the selected information, and updates an existing traveling route based on the selected information when determining that the update is necessary.

A cognitive information sharing system according to the present invention includes at least one autonomous traveling control device mounted on an autonomous vehicle traveling on a road together with at least one non-autonomous vehicle, and configured to collect information for autonomous traveling, and generate a QR code including the collected information; and a non-autonomous traveling control device mounted on the non-autonomous vehicle traveling on the road together with the autonomous vehicle and configured to provide the information included in the QR code to a driver, wherein the autonomous traveling control device includes a data collector configured to collect information for performing autonomous traveling; a QR code generator configured to generate the QR code including the collected information; and a traveling controller configured to perform control so that autonomous traveling is performed while the QR code is output to the outside on at least one of a front, side, and rear of the autonomous vehicle, and the non-autonomous traveling control device includes a QR code recognizer configured to determine whether received video information includes the QR code when video information obtained by filming a traveling process of the non-autonomous vehicle is received; a QR code analyzer configured to detect the information included in the QR code when the QR code is included; and a route guide configured to select only information necessary for traveling in the detected information and perform control so that the selected information is provided to a driver.

Further, the data collector collects at least one of the video information, distance information, position information, speed information, acceleration information, direction information, gravity information, weather information, road information, traffic information, and surrounding object information.

Further, the QR code generator changes a shape of the code each time the QR code generates the QR code.

Further, the traveling controller performs control so that the QR code is not output on the side of the autonomous vehicle in a direction in which there is no neighboring lane when a traveling lane of the autonomous vehicle is one of lanes at both ends of the road.

Further, the traveling controller performs control so that output brightness of the QR code is high when illuminance of an external environment in which the autonomous vehicle travels is lower than a preset reference.

Further, the QR code analyzer sets priorities for recognized QR codes when a plurality of QR codes are recognized, and assigns a greater weight to the QR codes in descending order of priorities to distinguish between information importance degrees of the respective QR codes.

Further, the QR code analyzer sets a higher priority for the QR code output from the autonomous vehicle closer to the non-autonomous vehicle.

Further, the route guide sorts the information included in the QR code in descending order of information importance degrees and selects information needed by the driver based on the sorted information.

Further, the route guide determines whether update of a currently set traveling route is necessary using the selected information, and updates an existing traveling route based on the selected information when determining that the update is necessary.

According to an embodiment of the present invention, the autonomous traveling control device can generate the QR code including information collected for autonomous traveling, and the non-autonomous traveling control device can recognize the QR code, analyze the QR code, detect the information included in the QR code, and provide the detected information to a driver of the non-autonomous vehicle.

Through this, it is possible to guide the driver of the non-autonomous vehicle so that the driver receives information on the autonomous vehicle in real time and drives safely.

DETAILED DESCRIPTION

Figure 1:
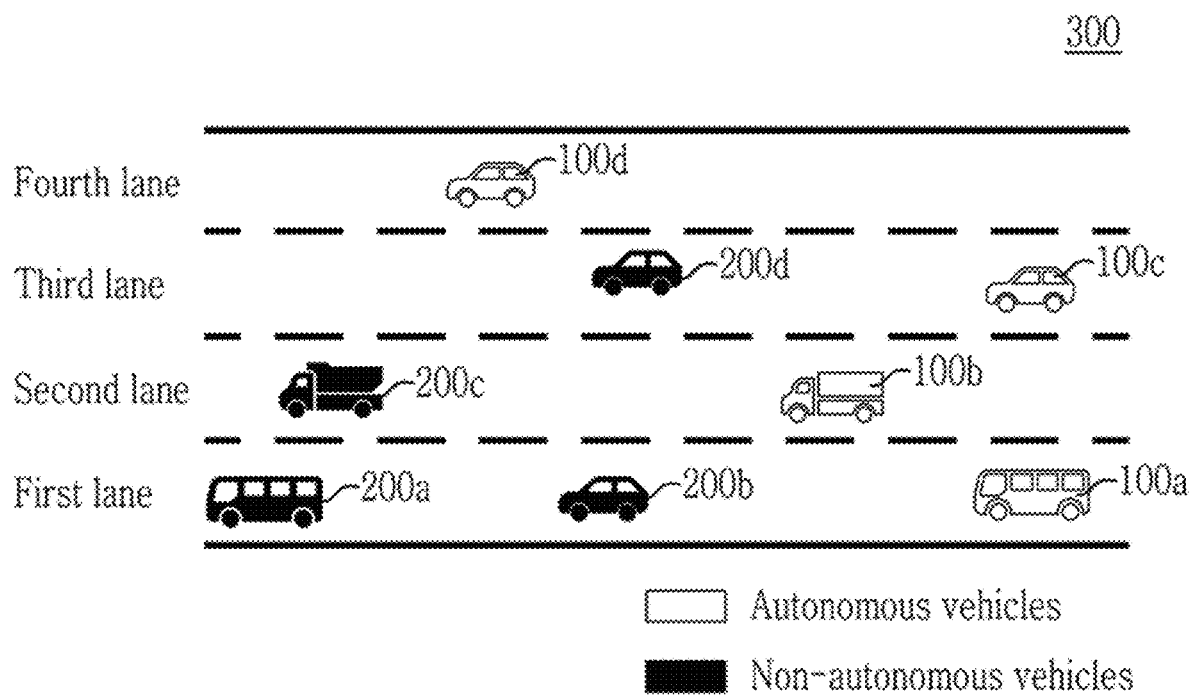
FIG. 1 is a configuration diagram illustrating a cognitive information sharing system according to an embodiment of the present invention.

Hereinafter, embodiments of the present invention will be described in detail with reference to the attached drawings so that those skilled in the art can easily implement the present invention. However, the present invention may be implemented in many different forms and is not limited to the embodiments described herein. In order to clearly describe the present invention in the drawings, parts unrelated to the description are omitted, and similar parts are denoted by similar reference signs throughout the specification.

In the present specification and drawings (hereinafter referred to as "the present specification"), duplicate description of the same components is omitted.

Also, in the present specification, when a component is mentioned as being 'coupled' or 'connected' to another component, the component may be directly coupled or connected to the other component, but it should be understood that there may be another component in between. On the other hand, in the present specification, a component is mentioned as being 'directly coupled' or 'directly connected' to another component, it should be understood that there are no other component in between.

Further, the terms used in the present specification are merely used to describe specific embodiments and are not intended to limit the present invention.

Also in the present specification, Singular expressions may include plural expressions, unless the context clearly indicates otherwise.

In addition, it should be understood that, in the present specification, terms such as 'include' or 'have' are only intended to designate the presence of features, numbers, steps, operations, components, parts, or combinations thereof described in the specification, and does not exclude a likelihood of the presence or addition of one or more other features, numbers, steps, operations, components, parts, or combinations thereof in advance.

Also, in the present specification, the term 'and/or' includes a combination of a plurality of described items or any of the plurality of described items. In the present specification, 'A or B' may include 'A', 'B', or 'both A and B'.

Further, in the present specification, detailed descriptions of well-known functions and configurations that may obscure the gist of the present invention will be omitted.

Figure 2:
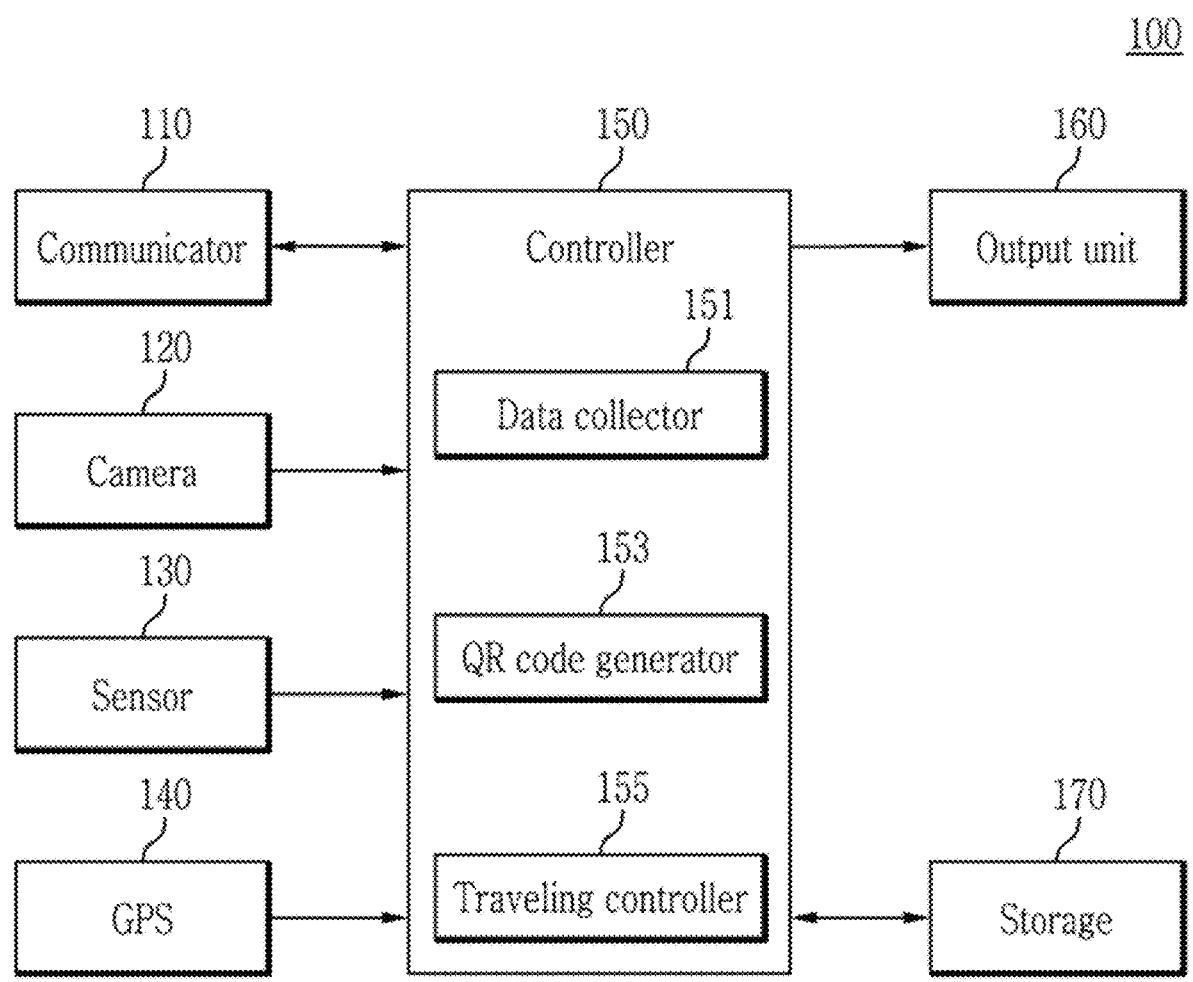
FIG. 2 is a block diagram illustrating an autonomous traveling control device according to an embodiment of the present invention.
Figure 3:
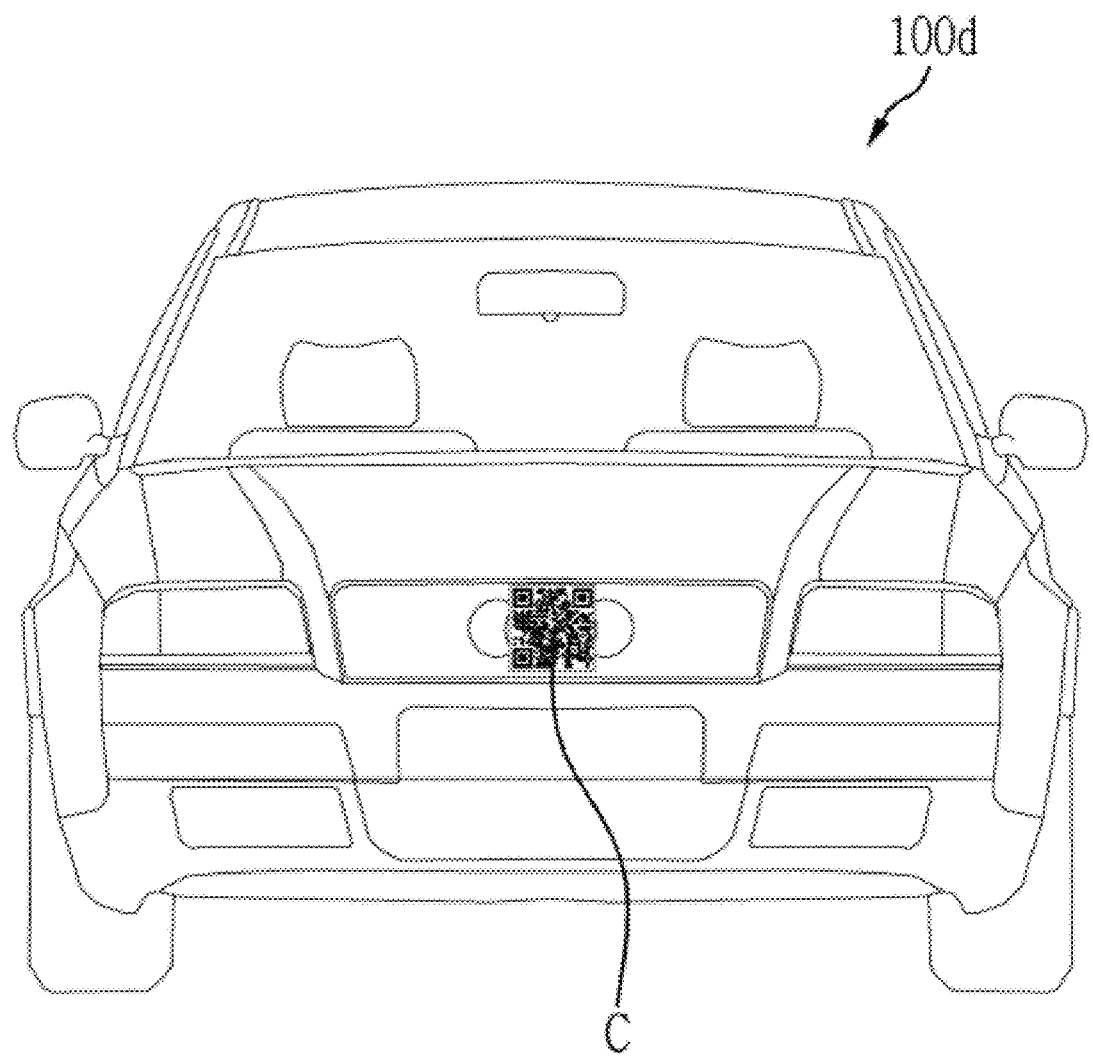
FIGS. 3 to 5 are diagrams illustrating a scene in which an autonomous vehicle outputs a QR code according to an embodiment of the present invention.
Figure 4:
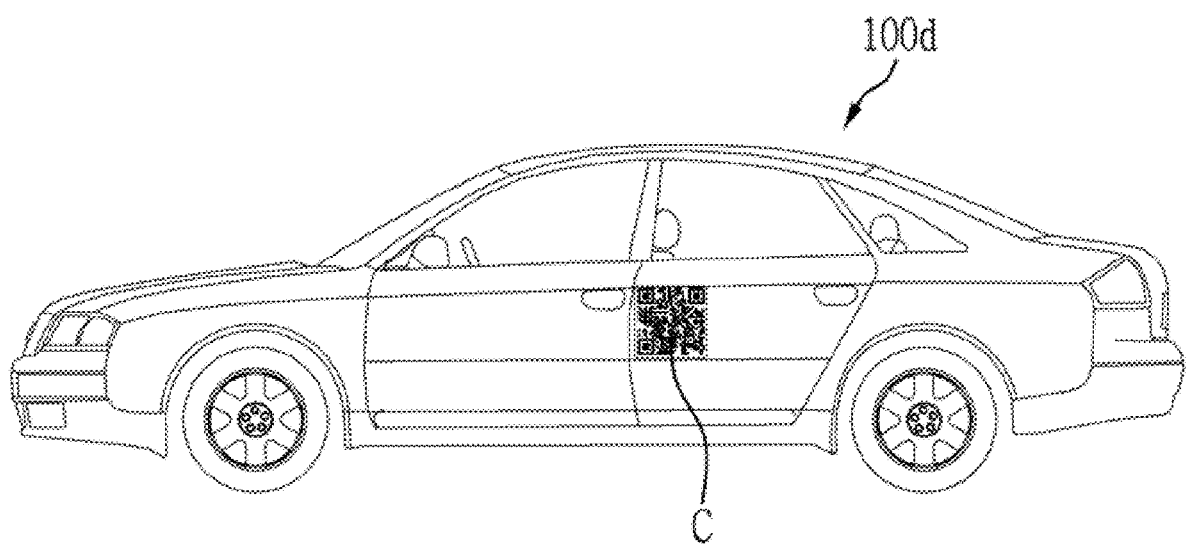
Figure 5:
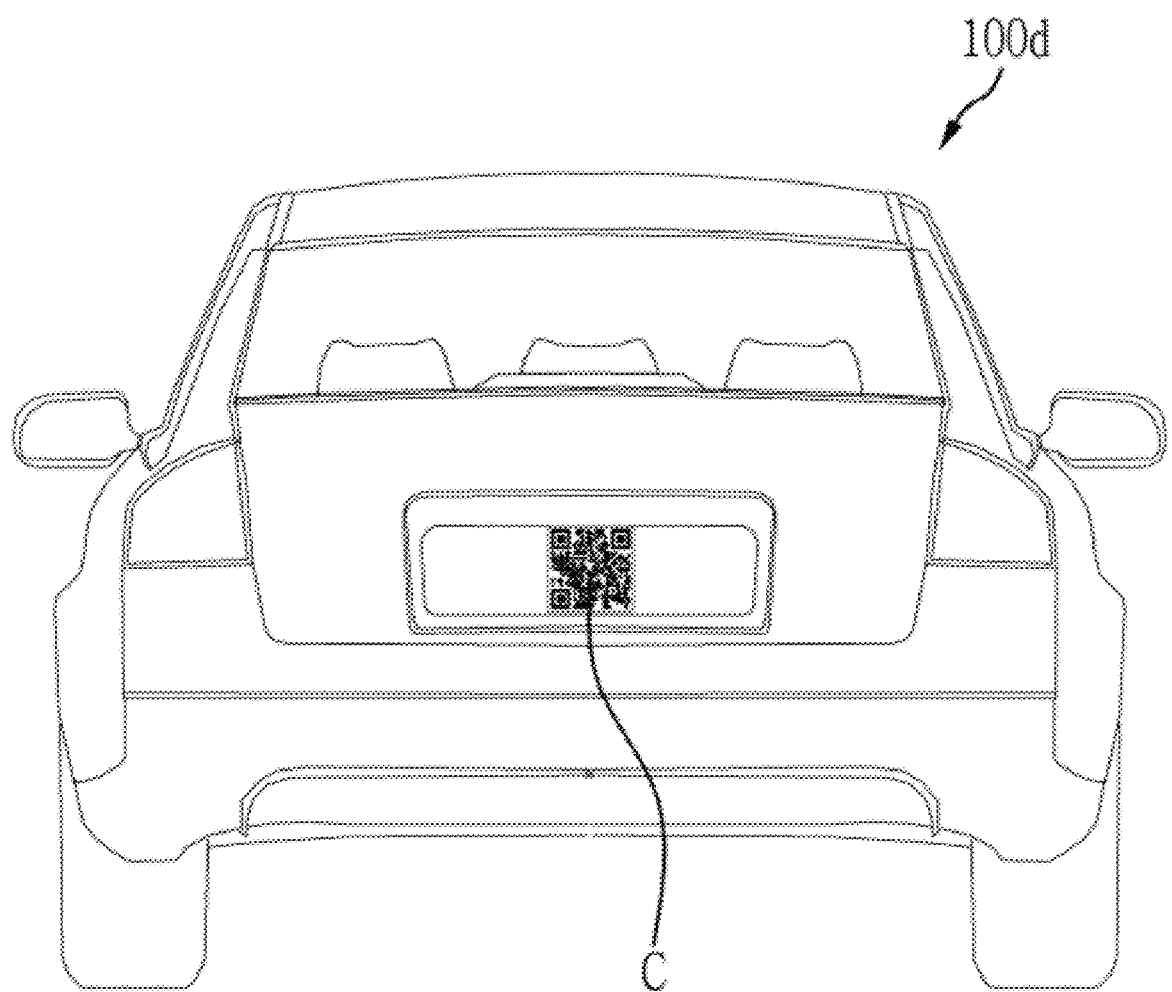
Figure 6:
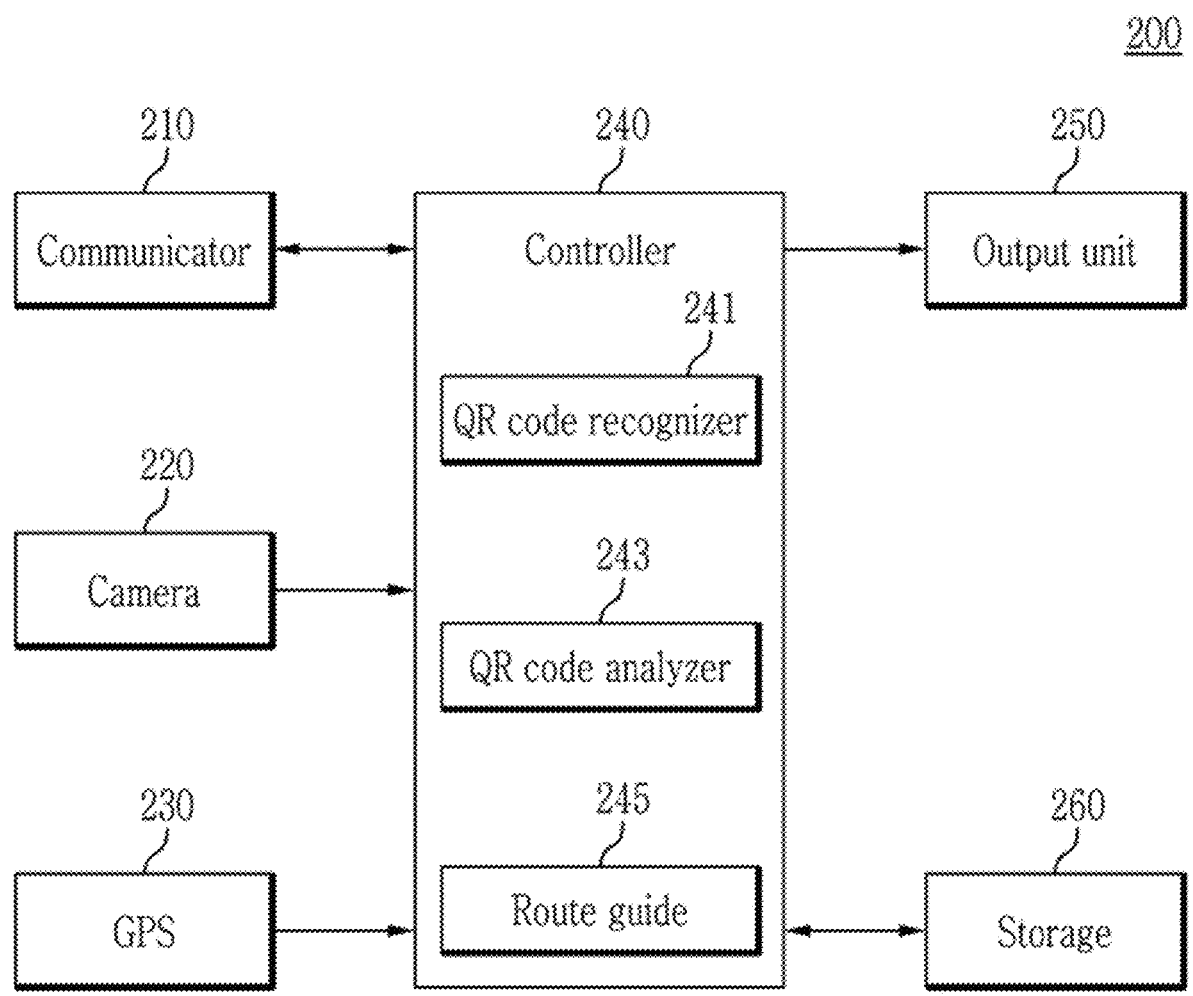
FIG. 6 is a block diagram illustrating a non-autonomous traveling control device according to an embodiment of the present invention.
Figure 7:
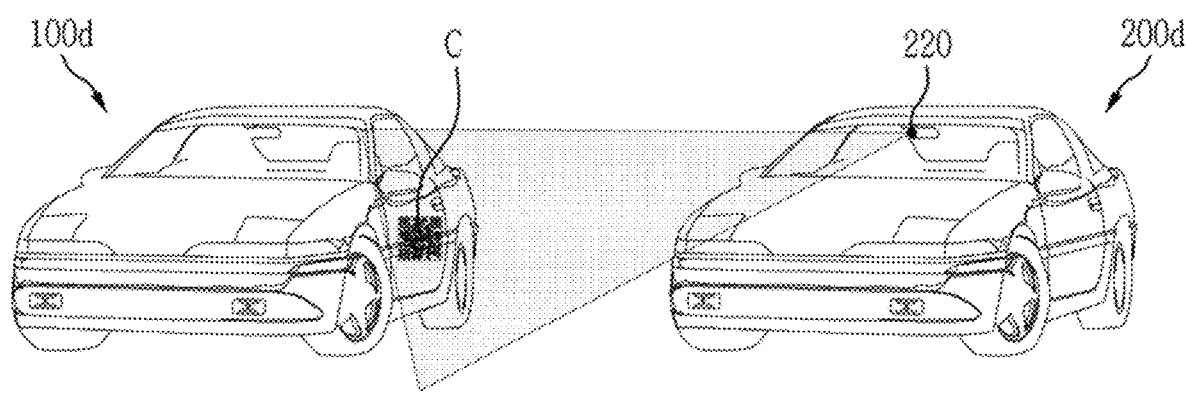
FIG. 7 is a diagram illustrating a process in which a non-autonomous vehicle recognizes the QR code according to an embodiment of the present invention.

FIG. 1 is a configuration diagram illustrating a cognitive information sharing system according to an embodiment of the present invention, FIG. 2 is a block diagram illustrating an autonomous traveling control device according to an embodiment of the present invention, FIGS. 3 to 5 are diagrams illustrating a scene in which an autonomous vehicle outputs a QR code according to an embodiment of the present invention, FIG. 6 is a block diagram illustrating a non-autonomous traveling control device according to an embodiment of the present invention, and FIG. 7 is a diagram illustrating a process in which the non-autonomous vehicle recognizes the QR code according to an embodiment of the present invention.

Referring to FIGS. 1 to 7, a cognitive information sharing system 300 helps in sharing traveling-related information collected by an autonomous traveling control device 100 included in an autonomous vehicle 100a, 100b, 100c, or 100d with a non-autonomous traveling control device 200 included in a non-autonomous vehicle 200a, 200b, 200c, or 200d without a separate device, so that a driver of the non-autonomous vehicle 200a, 200b, 200c, or 200d can obtain information necessary for driving. That is, the cognitive information sharing system 300 can be operated in an environment where there are both the autonomous vehicles 100a, 100b, 100c, and 100d and the non-autonomous vehicles 200a, 200b, 200c, and 200d. The cognitive information sharing system 300 includes the autonomous traveling control device 100 and the non-autonomous traveling control device 200.

The autonomous traveling control device 100 is mounted on each of the autonomous vehicles 100a, 100b, 100c, and 100d that travel on a road together with at least one non-autonomous vehicle 200a, 200b, 200c, or 200d. The autonomous traveling control device 100 collects information for autonomous traveling and generates a QR (Quick Response) code (C) including the collected information. To perform this, the autonomous traveling control device 100 includes a communicator 110, a camera 120, a sensor 130, a GPS 140, a controller 150, an output unit 160, and a storage 170.

The communicator 110 performs communication with a weather information providing server (not shown) that provides weather information and a road and traffic information providing server (not shown) that provides road information and traffic information. The communicator 110 may receive weather information for a current position and surrounding locations from the weather information providing server. The communicator 110 may receive road information including road condition information (for example, a paved road, an unpaved road, a national road, or a highway) of a road on which the vehicle is currently is traveling, and newly constructed road information, and traffic information including traffic condition information (for example, traffic congestion information and traffic accident information), and signal system information (for example, traffic light information, and regulated speed information) from a road and traffic information provision server.

The camera 120 includes a plurality of cameras and generates video information by filming surroundings of a road on which the autonomous vehicle travels. The plurality of cameras may be included to film a region in a direction of at least one of a front, side, and rear of the autonomous vehicle, and may preferably be included to film a surrounding environment in all directions with a current position as a reference.

The sensor 130 measures a physical movement of the autonomous vehicle. The sensor 130 may measure a speed, direction, gravity, acceleration, and the like of the autonomous vehicle. Further, the sensor 130 may measure a distance to an object (for example, a vehicle, person, animal, or obstacle) located around the autonomous vehicle. The sensor 130 may include an inertial measurement unit (IMU), radar, lidar, and the like.

The GPS 140 measures position information of the autonomous vehicle. The GPS 140 receives GPS information from a satellite and uses the received GPS information to measure current position information of the traveling autonomous vehicle.

The controller 150 performs overall control of the autonomous traveling control device 100. The controller 150 includes a data collector 151, a QR code generator 153, and a traveling controller 155.

The data collector 151 collects information for performing autonomous traveling. The data collector 151 collects the road information and traffic information received from the communicator 110 and the generated video information from the camera 120. Further, the data collector 151 collects at least one of measured distance information, speed information, acceleration information, direction information, and gravity information from the sensor 130, and collects position information from the GPS 140. The data collector 151 may recognize nearby objects using the collected video information and distance information and collect surrounding object information (for example, a type of object, and a distance to the object). The data collector 151 performs a preprocessing process of sorting the collected information in chronological order and filtering unnecessary or erroneous information in the sorted information.

The QR code generator 153 generates a QR code C including preprocessed information. The QR code generator 153 may generate and update a new QR code C in a preset cycle. In this case, the QR code generator 153 can increase security by changing a code shape each time the QR code generator 153 generates the QR code C. That is, the QR code generator 153 can ensure that information on the autonomous vehicle is exposed to a minimum.

The QR code generator 153 preferentially generates the QR code C so that all preprocessed information is included. However, when an amount of preprocessed information is too large to generate all information as the QR code C, the QR code generator 153 may select the information and then generate the QR code C using the selected information. The QR code generator 153 may select information to generate the QR code C in order of information collected at a shorter distance with the autonomous vehicle as a reference. For example, the QR code generator 153 of the autonomous vehicle traveling in a second lane of a four-lane road may preferentially select information collected from vehicles traveling in first and third lanes, which are lanes neighboring with the autonomous vehicle as a reference, and select information collected from vehicles traveling in a fourth lane farther away than the first and third lanes with a later priority. Through this, the QR code generator 153 can support smooth information sharing by first generating information having a greatest influence at the current time as the QR code C. The QR code C may include identification information of the autonomous vehicle, information related to the autonomous vehicle (for example, information on a surrounding object, information on a distance to the object, position information, speed information, acceleration information, direction information, gravity information, weather information of a traveling region, road information of the traveling region, and traffic information of the traveling region), and the like.

The traveling controller 155 controls autonomous traveling of the autonomous vehicle and output of the QR code C. The traveling controller 155 controls autonomous traveling of the autonomous vehicle based on preprocessed information. Further, the traveling controller 155 performs control so that the QR code C to is output on at least one of the front, side, and rear of the autonomous vehicle while performing autonomously traveling through controller area network (CAN) communication. In this case, the QR code C can be output through the output unit 160 installed in the autonomous vehicle.

Here, when a traveling lane of the autonomous vehicle is one of lanes at both ends of the road, the traveling controller 155 may control the QR code C so that the QR code C is not output on the side of the autonomous vehicle in a direction in which there is no neighboring lane. For example, the traveling controller 155 of the autonomous vehicle 100a traveling in a first lane of a 4-lane road may perform control so that the QR code C is not output on a left side (with the traveling direction as a reference) in a direction in which there is no neighboring lane. Further, the traveling controller 155 of the autonomous vehicle 100d running in a fourth lane of the 4-lane road may perform control so that the QR code C is not output on a right side (with the traveling direction as a reference) in a direction in which there is no neighboring lane. Through this, the traveling controller 155 can minimize energy consumption by blocking the output of the QR code on an unnecessary side in advance.

Further, the traveling controller 155 performs control output brightness of the QR code C is high when illuminance of the external environment in which the autonomous vehicle travels is lower than a preset reference. That is, the traveling controller 155 may control the output unit 160 so that the illuminance at which the QR code C is output is adjusted to be high when the autonomous vehicle is traveling in a tunnel, it is at night or dawn, or it is raining or cloudy. In this case, the traveling controller 155 may adjust the illuminance to prevent light blur from occurring in video information captured by other vehicles.

The output unit 160 includes a plurality of displays and outputs the QR code C through the displays. The output unit 160 may be included on at least one of the front, side, and rear of the autonomous vehicle, and preferably may be included on all sides including the front, side, and rear. For example, the output unit 160 may be included on or around a front bonnet of the autonomous vehicle 100d, on or around rear doors on both sides, and on or around a rear trunk. The display may include at least one of a liquid crystal display (LCD), a thin film transistor-liquid crystal display (TFT LCD), an organic light-emitting diode (OLED), a flexible display, and a 3D display.

The storage 170 stores a program or algorithm for driving the autonomous traveling control device 100. The storage 170 stores the information for performing autonomous traveling. In this case, the storage 170 may not store QR code for one-time use, but is not limited thereto. The storage 170 may include may include at least one storage medium among a flash memory type, a hard disk type, a multimedia card micro type, a card type memory (for example, an SD or XD memory), a random access memory (RAM), a static random access memory (SRAM), a read-only memory (ROM), an electrically erasable programmable read-only memory (EE-PROM), a programmable read-only memory (PROM), a magnetic memory, a magnetic disk, and an optical disc.

The non-autonomous traveling control device 200 is mounted on each of the non-autonomous vehicles 200a, 200b, 200c, and 200d traveling on a road together with at least one autonomous vehicle 100a, 100b, 100c, or 100d. The non-autonomous traveling control device 200 films the traveling process, and analyzes and outputs the information included in a QR code when the captured video information includes a QR code. To perform this, the non-autonomous traveling control device 200 includes a communicator 210, a camera 220, a GPS 230, a controller 240, an output unit 250, and a storage 260.

The communicator 210 performs communication with the road and traffic information provision server that provides road information and traffic information. The communicator 110 may receive road information including road condition information (for example, a paved road, an unpaved road, a national road, or a highway) of a road on which the vehicle is currently is traveling, and newly constructed road information, and traffic information including traffic condition information (for example, traffic congestion information and traffic accident information), and signal system information (for example, traffic light information, and regulated speed information) from the road and traffic information provision server.

The camera 220 includes a plurality of cameras and generates video information by filming surroundings of a road on which the non-autonomous vehicle travels. Preferably, the camera 220 can film a QR code output from the autonomous vehicle. To this end, the plurality of cameras may be included to film a region in a direction of at least one among a front, side, and rear of the non-autonomous vehicle. The camera 220 may be a black box, but is not limited thereto.

The GPS 230 measures position information of the non-autonomous vehicle. The GPS 230 receives GPS information from a satellite and measures the current position information of the non-autonomous vehicle using the received GPS information.

The controller 240 performs overall control of the non-autonomous traveling control device 200. The controller 240 includes a QR code recognizer 241, a QR code analyzer 243, and a route guide 245.

When the video information obtained by filming the traveling process is received, the QR code recognizer 241 determines whether the received video information includes a QR code. The QR code recognizer 241 may recognize the QR code using various recognition algorithms and, preferably, using an algorithm based on artificial intelligence technology.

When the QR code is included in the video information, the QR code analyzer 243 detects the information included in the QR code. The QR code analyzer 243 may detect may include the identification information of the autonomous vehicle, information related to the autonomous vehicle (for example, information on a surrounding object, information on a distance to the object, position information, speed information, acceleration information, direction information, gravity information, weather information of a traveling region, road information of the traveling region, and traffic information of the traveling region), and the like included in the QR code. When a plurality of QR codes are recognized simultaneously, the QR code analyzer 243 detects information on each of the plurality of recognized QR codes. In this case, the QR code analyzer 243 may set priorities for the recognized QR codes and assign a greater weight to the QR codes in descending order of priorities to distinguish between information importance degrees of the respective QR codes. In this case, the QR code analyzer 243 may set a higher priority for the QR code output from the autonomous vehicle that is closer to the non-autonomous vehicle. That is, the QR code analyzer 243 may set autonomous vehicle-related information that may have more influence on driving of driver with a higher priority.

The route guide 245 sorts the information included in the QR code in descending order of an information importance degree and selects information needed by the driver based on the sorted information. For example, the information needed by the driver may include a distance to the autonomous vehicle, a speed, acceleration, and direction of the autonomous vehicle, road information on surrounding roads, traffic information, weather information, and surrounding object information. The route guide 245 uses the selected information to determine whether update of a currently set traveling route is necessary. When the route guide 245 determines that the update is necessary, the route guide 245 may update an existing traveling route based on the selected information. Further, the route guide 245 may perform control so that the selected information is provided to the driver. The route guide 245 can inform the driver of a traffic accident situation, traffic congestion situation, safe distance maintenance warning, road skid prevention warning, accident black spot warning, and the like. Through this, the route guide 245 supports the driver so that the driver can drive safely.

The output unit 250 outputs information necessary for driving to the driver. The output unit 250 may output information through at least one of visual and auditory effects. For example, the output unit 250 may output route guidance, notification message, warning message, or the like through at least one of a display and a sound.

The storage 260 stores a program or algorithm for driving the non-autonomous traveling control device 200. The storage 260 stores information obtained through the autonomous vehicle. Further, the storage 260 stores route-related information. The storage 260 may include at least one storage medium among a flash memory type, a hard disk type, a media card micro type, a card type memory (for example, an SD or XD memory), a RAM, an SRAM, a ROM, an EEPROM, a PROM, a magnetic memory, a magnetic disk, and an optical disc.

Figure 8:
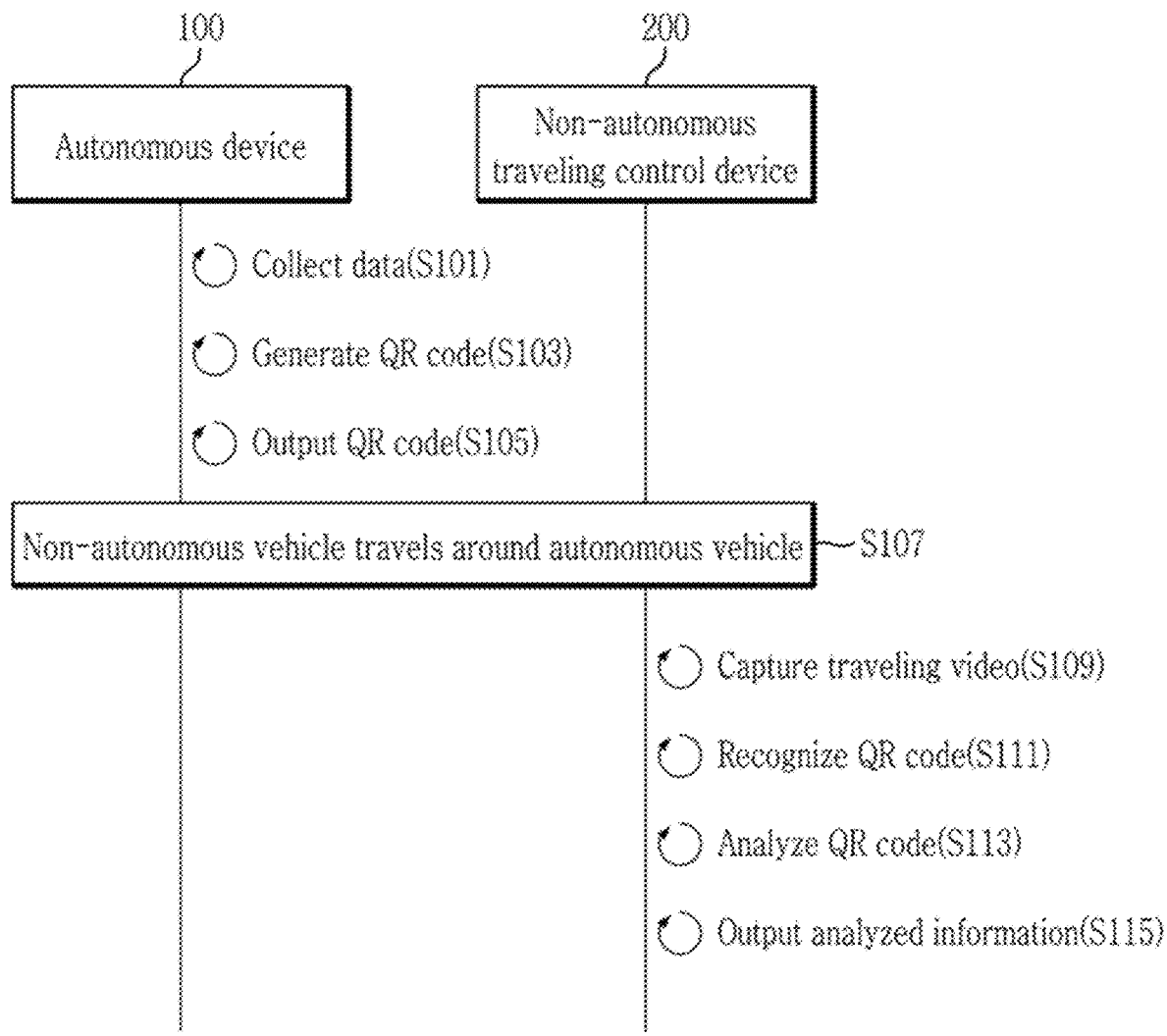
FIG. 8 is a flowchart illustrating a cognitive information sharing method according to an embodiment of the present invention.

FIG. 8 is a flowchart illustrating a cognitive information sharing method according to an embodiment of the present invention.

Referring to FIG. 8, the cognitive information sharing method guides the driver of the non-autonomous vehicle so that the driver receives information on the autonomous vehicle in real time and drives safely.

In step S101, the autonomous traveling control device 100 mounted on the autonomous vehicle collects data. The autonomous device 100 collects the information for performing autonomous traveling. The autonomous traveling control device 100 may collect at least one of the video information, distance information, position information, speed information, acceleration information, direction information, gravity information, weather information, road information, traffic information, and surrounding object information.

In step S103, the autonomous traveling control device 100 generates the QR code. The autonomous traveling control device 100 generates the QR code including the collected information. Here, the QR code may include identification information of the autonomous vehicle, information related to the autonomous vehicle (for example, information on a surrounding object, information on a distance to the object, position information, speed information, acceleration information, direction information, gravity information, weather information of a traveling region, road information of the traveling region, and traffic information of the traveling region), and the like.

In step S105, the autonomous traveling control device 100 outputs the QR code. The autonomous traveling control device 100 performs control so that autonomous traveling is performed while the QR code is output to the outside on the at least one of the front, side, and rear of the autonomous vehicle.

When the non-autonomous vehicle travels around the autonomous vehicle (S107), the non-autonomous traveling control device 200 captures a traveling video in step S109. In this case, the non-autonomous traveling control device 200 may film surrounding traveling autonomous vehicles.

In step S111, the non-autonomous traveling control device 200 recognizes the QR code. The non-autonomous traveling control device 200 recognizes the QR code included in the captured video information.

In step S113, the non-autonomous traveling control device 200 analyzes the QR code. The non-autonomous traveling control device 200 detects information included in the QR code. The non-autonomous traveling control device 200 may detect the identification information of the autonomous vehicle, information related to the autonomous vehicle (for example, information on a surrounding object, information on a distance to the object, position information, speed information, acceleration information, direction information, gravity information, weather information of a traveling region, road information of the traveling region, and traffic information of the traveling region), and the like included in the QR code.

In step S115, the non-autonomous traveling control device 200 outputs the analyzed information. The non-autonomous traveling control device 200 selects only the information necessary for traveling from among the detected pieces of information. The non-autonomous traveling control device 200 performs control so that the selected information is provided to the driver.

Figure 9:
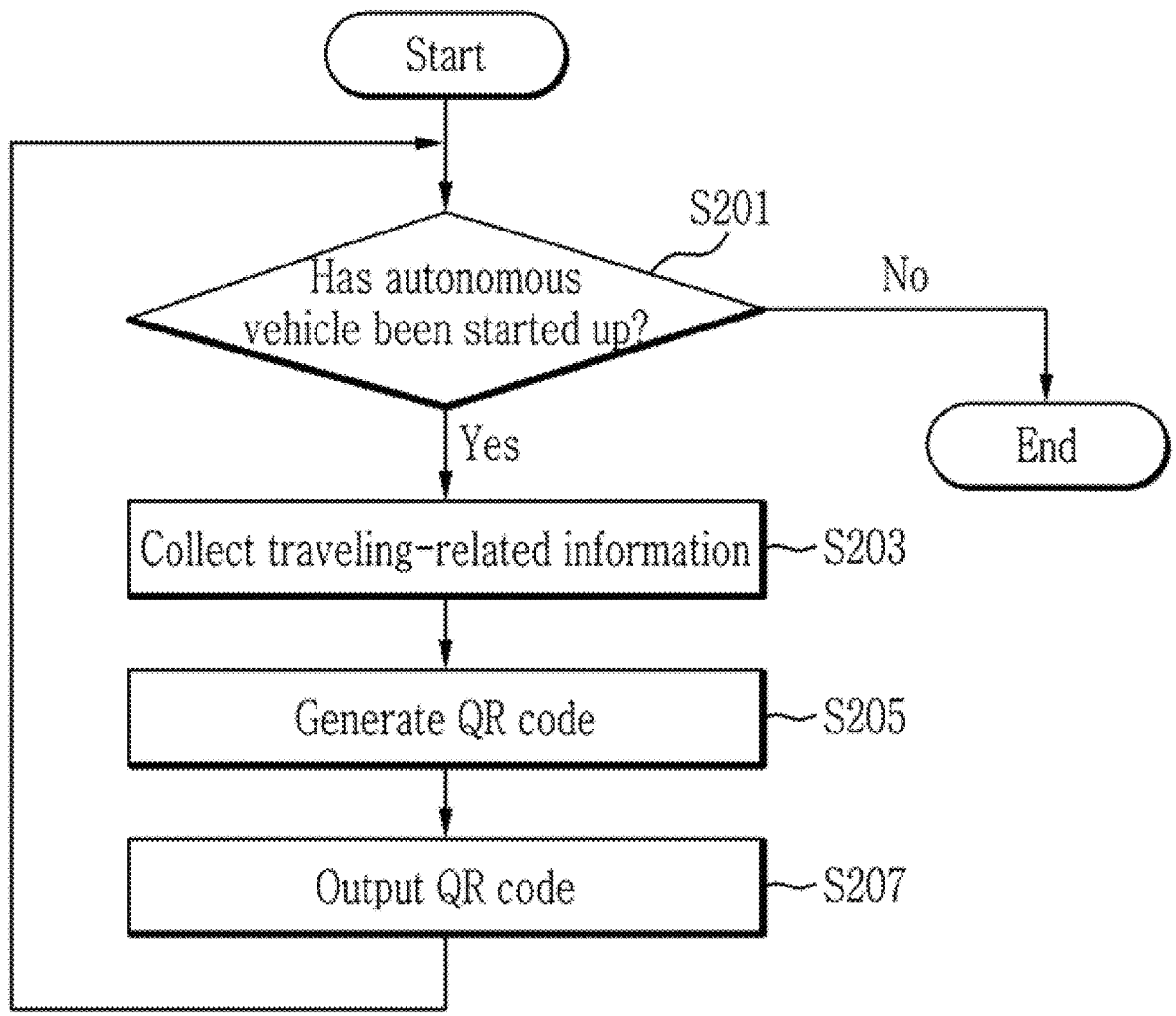
FIG. 9 is a flowchart illustrating an autonomous traveling control method according to an embodiment of the present invention.

FIG. 9 is a flowchart illustrating an autonomous traveling control method according to an embodiment of the present invention.

Referring to FIGS. 1 and 9, the autonomous traveling control device 100 generates a QR code including information collected for autonomous traveling and shares the generated QR code. In step S201, the autonomous traveling control device 100 determines whether an autonomous vehicle having the autonomous traveling control device 100 mounted thereon is started up. The autonomous traveling control device 100 performs step S230 when the autonomous vehicle is started up, and ends traveling when the autonomous vehicle stalls.

In step S203, the autonomous traveling control device 100 collects the traveling-related information. The autonomous traveling control device 100 may collect the information for performing autonomous traveling and sort the collected information in time series order. The autonomous traveling control device 100 may perform a preprocessing process for filtering unnecessary or erroneous information among the sorted pieces of information.

In step S205, the autonomous traveling control device 100 generates the QR code. The autonomous traveling control device 100 may newly generate the QR code C and perform updating in a preset cycle. Further, the autonomous traveling control device 100 may change the code shape each time the autonomous traveling control device 100 generates the QR code, thereby improving security.

In step S207, the autonomous traveling control device 100 outputs the QR code. The autonomous control device 100 performs control so that the QR code is output on at least one of a front, side, and rear of an exterior of the vehicle while the autonomous vehicle is performing the autonomous traveling. In this case, when the traveling lane of the autonomous vehicle is one of the lanes at both ends of the road, the autonomous traveling control device 100 performs control so that the QR code is not output on the side of the autonomous vehicle in a direction in which there is no neighboring lane when a traveling lane of the autonomous vehicle is one of lanes at both ends of the road, thereby preventing unnecessary energy loss. Further, the autonomous traveling control device 100 may perform control so that the output brightness of the QR code is high when the illuminance of the external environment in which the autonomous vehicle travels is lower than the preset reference. The autonomous traveling control device 100 outputs the QR code and then performs step S201 again.

Figure 10:
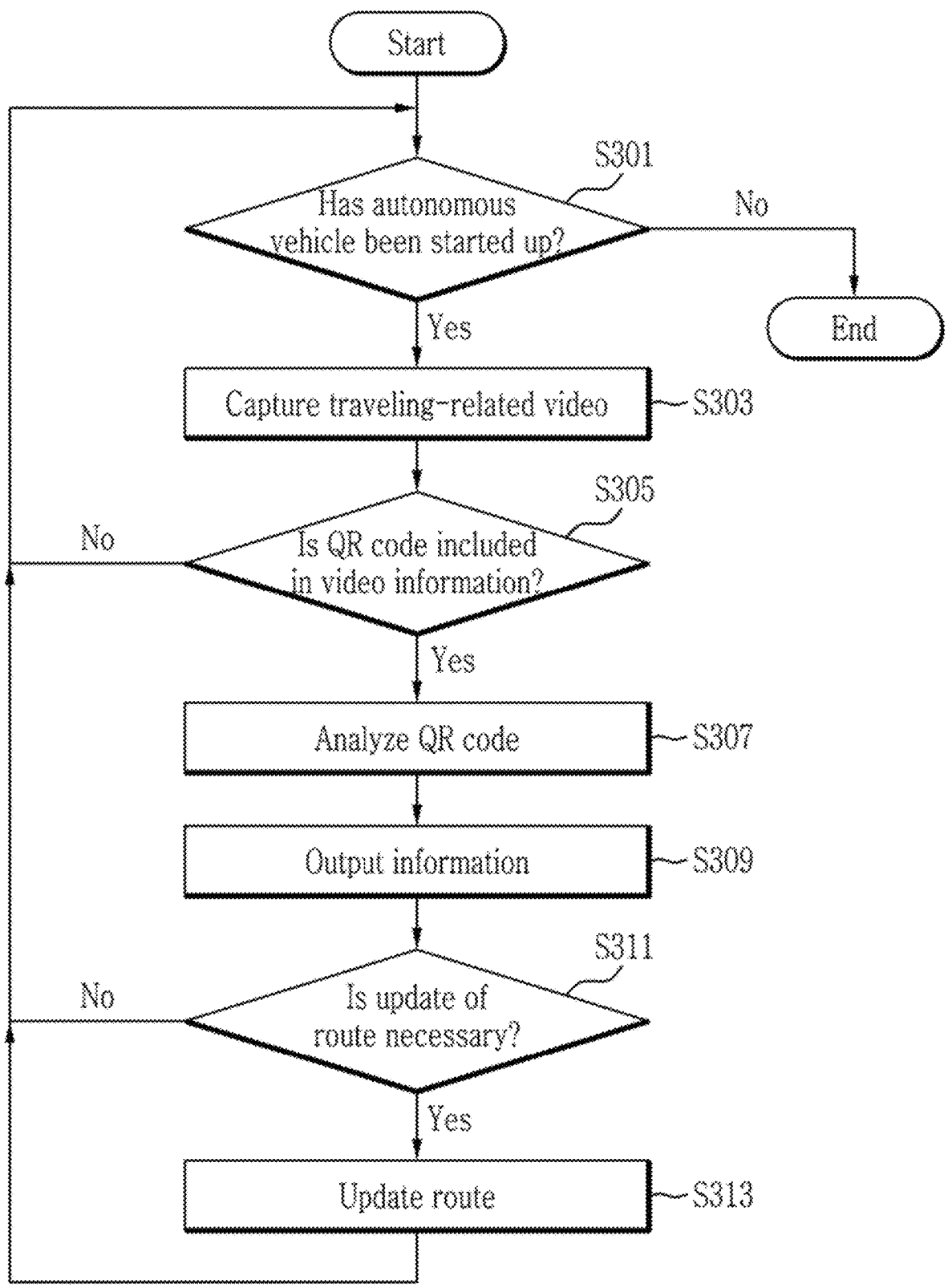
FIG. 10 is a flowchart illustrating a non-autonomous traveling control method according to an embodiment of the present invention.

FIG. 10 is a flowchart illustrating a non-autonomous traveling control method according to an embodiment of the present invention.

Referring to FIGS. 1 and 10, the non-autonomous traveling control device 200 may recognize the QR code of the autonomous vehicle, analyze the QR code, detects the information included in the QR code, and provide the detected information to the driver of the non-autonomous vehicle.

In step S301, the non-autonomous traveling control device 200 determines whether the non-autonomous vehicle having the non-autonomous traveling control device 200 mounted thereon is started up. The non-autonomous traveling control device 200 performs step S303 when the non-autonomous vehicle is started on, and ends driving when the non-autonomous vehicle stalls.

In step S303, the non-autonomous traveling control device 200 captures a traveling-related video. The non-autonomous traveling control device 200 generates the video information by filming surroundings of the road on which the non-autonomous vehicle travels.

In step S305, the non-autonomous traveling control device 200 determines whether the video information includes the QR code. The non-autonomous traveling control device 200 recognizes whether the video information includes the QR code, performs step S307 when the video information includes the QR code, and performs step S301 again when the video information includes the QR code.

In step S307, the non-autonomous traveling control device 200 analyzes the QR code. The non-autonomous traveling control device 200 detects information included in the QR code. In this case, when a plurality of QR codes are recognized, the non-autonomous traveling control device 200 may set priorities for the recognized QR codes and assign a greater weight to the QR codes in descending order of priorities to distinguish between information importance degrees of the respective QR codes. The non-autonomous traveling control device 200 can give a high score to the QR code having a greater influence on traveling by setting the higher priority for the QR code output from the autonomous vehicle closer to the non-autonomous vehicle having the non-autonomous traveling control device mounted thereon.

In step S309, the non-autonomous traveling control device 200 outputs information. The non-autonomous traveling control device 200 selects and outputs information necessary for the That is, the non-autonomous traveling control device 200 may sort the information driver. included in the QR code in descending order of the information importance degree and select the information needed by the driver based on the sorted information. Here, the non-autonomous traveling control device 200 may select necessary information from the sorted information based on a field of interest and driving pattern of the driver, a status of the non-autonomous vehicle, or the like. For example, when there is a traveling pattern in which the driver uses a detour each time a traffic accident occurs, necessary information can be selected based on such information, and when an amount of fuel of the non-autonomous vehicle is equal to or smaller than a preset reference, necessary information may be selected based on the information. The non-autonomous traveling control device 200 may output the information so that at least one of visual and auditory effects appears.

In step S311, the non-autonomous traveling control device 200 determines whether route update is necessary. The non-autonomous traveling control device 200 uses the selected information to determine whether the update of the currently set traveling route is necessary, performs step S313 when update of the traveling route is necessary, and performs step S301 again when the update of the traveling route is not necessary.

In step S313, the non-autonomous traveling control device 200 performs the route update. The non-autonomous traveling control device 200 may update an existing traveling route based on the selected information. This makes it possible for the non-autonomous traveling control device 200 to support providing the driver with a traveling route that reflects the latest information.

Figure 11:
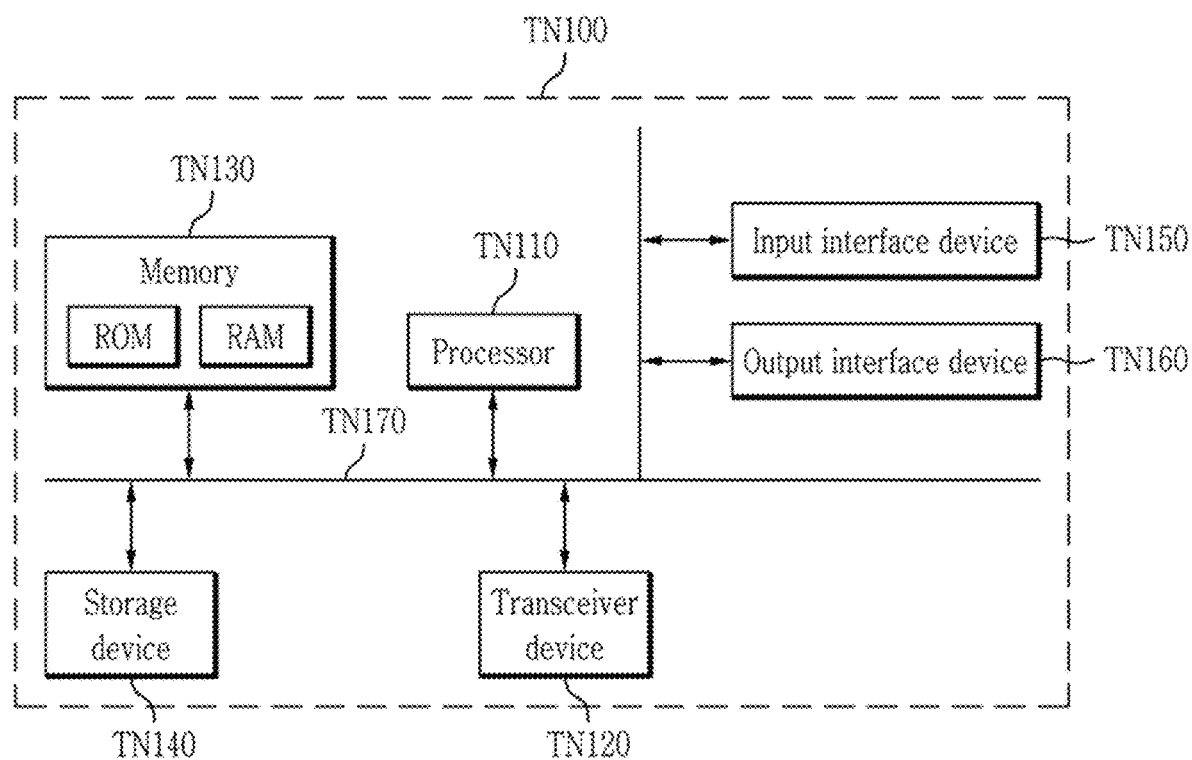
FIG. 11 is a block diagram illustrating a computing device according to an embodiment of the present invention.

FIG. 11 is a block diagram illustrating a computing device according to an embodiment of the present invention.

Referring to FIG. 11, a computing device TN100 may be a device described in the present specification (for example, the autonomous traveling control device or the non-autonomous traveling control device).

The computing device TN100 may include at least one processor TN110, a transceiver device TN120, and a memory TN130. Further, the computing device TN100 may further include, for example, a storage device TN140, an input interface device TN150, an output interface device TN160. Components included in the computing device TN100 may be connected by a bus TN170 and perform communication with each other.

The processor TN110 may execute a program command stored in at least one of the memory TN130 and the storage device TN140. The processor TN110 may refer to a central processing unit (CPU), a graphics processing unit (GPU), or a dedicated processor on which methods according to embodiments of the present invention are performed. The processor TN110 may be configured to implement procedures, functions, and methods described in connection with the embodiments of the present invention. The processor TN110 may control each component of the computing device TN100.

Each of the memory TN130 and the storage device TN140 may store various types of information related to an operation of the processor TN110. Each of the memory TN130 and the storage device TN140 may be configured of at least one of a volatile storage medium and a non-volatile storage medium. For example, the memory TN130 may be configured of at least one of a read only memory (ROM) and a random access memory (RAM).

The transceiver device TN120 can transmit or receive a non-radio signal or a radio signal. The transceiver device TN120 may be connected to a network and perform communication.

Meanwhile, the embodiments of the present invention are not only implemented through the device and/or method described so far, but may also be implemented through a program that realizes the functions corresponding to the configuration of the embodiment of the present invention or a recording medium having the program recorded thereon, and this implementation can be easily performed by anyone skilled in the art from the description of the embodiments described above.

Although the embodiments of the present invention have been described in detail above, the right scope of the present invention is not limited thereto, and various modifications and improvements made by those skilled in the art using the basic concept of the present invention defined in the following claims also fall within the right scope of invention.

What is claimed is:

1. An autonomous traveling control device for an autonomous vehicle traveling on a road together with at least one non-autonomous vehicle, the autonomous traveling control device comprising:
    a data collector configured to collect a first information for performing autonomous traveling;
    a predetermined code generator configured to generate a predetermined code including the collected first information; and
    a traveling controller configured to perform control so that autonomous traveling is performed while the predetermined code is output to an outside on at least one of a front side, a left side, a right side and a rear side of the autonomous vehicle,
    wherein
    when a traveling lane of the autonomous vehicle is one of lanes at both most outer lanes of the road, the traveling controller is configured not to output the predetermined code on the left side or the right side of the autonomous vehicle in a direction in which there is no neighboring lane, and
    when the traveling lane of the autonomous vehicle is not one of the lanes at the both most outer lanes of the road, the traveling controller is configured to output the predetermined code on the left side or the right side of the autonomous vehicle.

2. The autonomous traveling control device of claim 1, wherein the data collector collects at least one of video information, distance information, position information, speed information, acceleration information, direction information, gravity information, weather information, road information, traffic information, and surrounding object information.

3. The autonomous traveling control device of claim 1, wherein the predetermined code generator changes a shape of the code each time the predetermined code generates the QR predetermined code.

4. The autonomous traveling control device of claim 1, wherein the traveling controller performs control so that output brightness of the predetermined code is high when illuminance of an external environment in which the autonomous vehicle travels is lower than a preset reference.

5. A non-autonomous traveling control device for a non-autonomous vehicle traveling on a road together with at least one autonomous vehicle that outputs a predetermined code, the non-autonomous traveling control device comprising:
    a predetermined code recognizer configured to determine whether a received video information includes the predetermined code when the video information obtained by filming a traveling process of the non-autonomous vehicle is received;
    a predetermined code analyzer configured to detect a first information included in the predetermined code when the predetermined code is included in the video information; and
    a route guide configured to select a second information necessary for traveling from the detected first information and perform control so that the selected second information is provided to a driver,
    wherein the predetermined code recognizer recognizes a plurality of predetermined codes, and the predetermined code analyzer sets priorities for the recognized plurality of predetermined codes and assigns a different weight to the plurality of predetermined codes in descending order of priorities in order to distinguish an information importance degree of each of the plurality of predetermined codes.

6. The non-autonomous traveling control device of claim 5, wherein the predetermined code analyzer sets a higher priority for the predetermined code output from the autonomous vehicle closer to the non-autonomous vehicle.

7. The non-autonomous traveling control device of claim 5, wherein the route guide sorts the first information included in the predetermined code in descending order of information importance degrees and selects information needed by the driver based on the sorted information.

8. The non-autonomous traveling control device of claim 5, wherein the route guide determines whether update of a currently set traveling route is necessary using the selected second information, and updates an existing traveling route based on the selected second information when determining that the update is necessary.

9. A cognitive information sharing system, comprising:
    at least one autonomous traveling control device mounted on an autonomous vehicle traveling on a road together with at least one non-autonomous vehicle, and configured to collect a first information for autonomous traveling, and generate a predetermined code including the collected first information; and
    a non-autonomous traveling control device mounted on the non-autonomous vehicle traveling on the road together with the autonomous vehicle and configured to provide the predetermined code to a driver, wherein
    the autonomous traveling control device includes:
    a data collector configured to collect the first information for performing autonomous traveling;
    a predetermined code generator configured to generate the predetermined code including the collected first information; and
    a traveling controller configured to perform control so that autonomous traveling is performed while the predetermined code is output to an outside on at least one of a front side, a left side, a right side and a rear side of the autonomous vehicle, and
    the non-autonomous traveling control device includes:
    a predetermined code recognizer configured to determine whether received video information includes the predetermined code when the video information obtained by filming a traveling process of the non-autonomous vehicle is received;
    a predetermined code analyzer configured to detect the first information included in the predetermined code when the predetermined code is included in the video information; and
    a route guide configured to select a second information necessary for traveling from the detected first information and perform control so that the selected second information is provided to a driver,
    wherein the predetermined code recognizer recognizes a plurality of predetermined codes, and the predetermined code analyzer sets priorities for the recognized plurality of predetermined codes and assigns a different weight to the plurality of predetermined codes in descending order of priorities in order to distinguish an information importance degree of each of the plurality of predetermined codes.

10. The cognitive information sharing system of claim 9, wherein the data collector collects at least one of the video information, distance information, position information, speed information, acceleration information, direction information, gravity information, weather information, road information, traffic information, and surrounding object information.

11. The cognitive information sharing system of claim 9, wherein the predetermined code generator changes a shape of the code each time the predetermined code generates the predetermined code.

12. The cognitive information sharing system of claim 9, wherein the traveling controller performs control so that the predetermined code is not output on the left side or the right side of the autonomous vehicle in a direction in which there is no neighboring lane when a traveling lane of the autonomous vehicle is one of lanes at both ends of the road.

13. The cognitive information sharing system of claim 9, wherein the traveling controller performs control so that output brightness of the predetermined code is high when illuminance of an external environment in which the autonomous vehicle travels is lower than a preset reference.

14. The cognitive information sharing system of claim 9, wherein the predetermined code analyzer sets a higher priority for the predetermined code output from the autonomous vehicle closer to the non-autonomous vehicle.

15. The cognitive information sharing system of claim 9, wherein the route guide sorts the first information included in the predetermined code in descending order of information importance degrees and selects information needed by the driver based on the sorted information.

16. The cognitive information sharing system of claim 9, wherein the route guide determines whether update of a currently set traveling route is necessary using the selected second information, and updates an existing traveling route based on the selected second information when determining that the update is necessary.

* * * * *